United States Patent
Adams, Jr. et al.

[11] 3,848,965
[45] Nov. 19, 1974

[54] METHOD OF CONTROLLING MONOCHROMATIC COLLIMATED LIGHT BY CONTROLLING THE LIGHT REFLECTION BAND OF A LIQUID CRYSTAL

[75] Inventors: James E. Adams, Jr., Ontario; Werner E. L. Haas, Webster, both of N.Y.

[73] Assignee: Xerox Corporation, Stamford, Conn.

[22] Filed: Oct. 17, 1973

[21] Appl. No.: 407,385

[52] U.S. Cl. ............................................ 350/160 LC
[51] Int. Cl. ................................................. G02f 1/16
[58] Field of Search ............................. 350/160 LC

[56] References Cited
UNITED STATES PATENTS

| | | | |
|---|---|---|---|
| 3,642,348 | 2/1972 | Wysocki et al. | 350/160 LC |
| 3,652,148 | 3/1972 | Wysocki et al. | 350/150 |
| 3,680,950 | 8/1972 | Haas et al. | 350/150 |
| 3,726,584 | 4/1973 | Adams et al. | 350/150 |
| 3,791,716 | 2/1974 | Borel et al. | 350/160 LC |

*Primary Examiner*—Edward S. Bauer
*Attorney, Agent, or Firm*—James J. Ralabate; David C. Petre; Gaetano D. Maccarone

[57] ABSTRACT

A method wherein an optically negative liquid crystal film or layer which initially does not substantially scatter incident monochromatic light is caused to diffusely scatter the incident light by means of relatively small pitch changes effected in the optically negative material. An imaging system wherein an optically negative liquid crystal film is imaged in the desired image configuration by the above-described method is also disclosed.

17 Claims, 7 Drawing Figures

METHOD OF CONTROLLING MONOCHROMATIC COLLIMATED LIGHT BY CONTROLLING THE LIGHT REFLECTION BAND OF A LIQUID CRYSTAL

BACKGROUND OF THE INVENTION

This invention relates to a liquid crystal imaging system and, more particularly, to a liquid crystal imaging system which employs an imaging member comprising a film or layer of an optically negative liquid crystalline material.

Liquid crystalline substances exhibit physical characteristics, some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well-known in the liquid crystal art.

Liquid crystal materials have been found to be highly advantageous for use in many different applications including, for example, in imaging and display systems. In particular, optically negative liquid crystalline materials have been disclosed as being suitable for use in imaging systems, optical filter systems, in thermometers, for detecting flaws in structural members and in medical applications. Of course, many other uses could be described but these should be sufficient to indicate the varied and important applications of optically negative liquid crystalline materials. In growing areas of technology, such as the field of liquid crystals, there is often discovered a new mode of application of the known technology. The present invention relates to a liquid crystalline imaging system which comprises an imaging member comprising a film or layer of an optically negative liquid crystalline material.

SUMMARY OF THE INVENTION

It is, therefore, an object of this invention to provide a method for converting an optically negative liquid crystal film from a substantially non scattering state to a diffusely light scattering state.

It is another object of the invention to provide such a method which exploits the reflective circular dichroism property of optically negative liquid crystalline materials.

It is a further object of the invention to provide a method in which relatively small pitch changes effected in an optically negative liquid crystalline film cause the film to diffusely scatter incident collimated monochromatic light.

It is still another object of the invention to provide a novel imaging or display system.

It is yet another object of the invention to provide an imaging or display system suitable for use with imaging members which may be addressed by various thermal and electrical means.

Another object of the invention is to provide a transient imaging or display system.

A still further object of the invention is to provide an imaging or display system which is capable of producing intense and sharply defined images.

These and other objects and advantages are accomplished in accordance with the invention by directing collimated monochromatic light upon an imaging member comprising a film or layer of an optically negative liquid crystalline material which is in the Grandjean texture state. The incident light is selected so that, initially, it is not substantially attenuated or diffusely scattered by the liquid crystal film. A relatively small pitch change is effected in the liquid crystal material by applying thereto some external stimulus to which the material is sensitive, thus causing the film to diffusely scatter the incident light. The method involves matching the proper combination of the pitch of the liquid crystalline material, angle of incidence of the incident light and wavelengths of the incident light to produce a diffusely scattering condition as will be more fully discussed below. This method for placing an optically negative liquid crystalline material in a diffusely light scattering state is used to image an optically negative liquid crystalline imaging member in the desired image configuration.

BRIEF DESCRIPTION OF THE DRAWINGS

For a better understanding of the invention as well as other objects and further features thereof, reference is made to the following detailed disclosure of various preferred embodiments of the invention taken in conjunction with the accompanying drawings thereof wherein.

DESCRIPTION OF THE PREFERRED EMBODIMENTS

Figure 1:
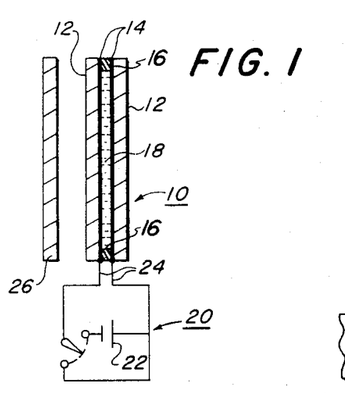
FIG. 1 is a partially schematic, cross-sectional view of a liquid crystalline imaging member.

FIG. 1 illustrates an embodiment of a liquid crystal imaging system according to the invention. Referring now to FIG. 1, a typical liquid crystal imaging member, generally designated 10, is shown in partially schematic cross-sectional view wherein a pair of transparent plates 12 having substantially transparent conductive coating 14 on one surface comprise a parallel pair of substantially transparent electrodes. An imaging member wherein both electrodes are transparent is preferred where the imaging member is to be viewed using transmitted light; however, the liquid crystalline imaging member may also be viewed using reflected light thereby requiring only a single transparent electrode while the other may be opaque. The transparent electrodes are separated by spacing member 16 which contains voids which form one or more shallow cups which contain the optically negative liquid crystalline film or layer 18 which comprises the active element of the imaging member. A field is created between the electrodes by an external circuit 20 which typically comprises a source of potential 22 which is connected across the two electrodes through leads 24. The circuit 20 may also contain suitable switching means. The potential source may be either D.C., A.C., or a combination thereof. Also shown is optional circular polarizer means 26.

Any suitable optically negative liquid crystalline material may be used in the display screen. Birefringence, also referred to as double refraction, is an optical phenomenon characteristic of many solid crystals and all liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "optically negative liquid crystalline material," as used herein, is meant those for which the extraordinary index of refraction $n$ E is smaller than the ordinary index of refraction $n$ o. Cholesteric liquid crystal substances exhibit this property. For a detailed description of this phenomenon, see *Optical Crystallography*, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The half intensity bandwidth $\Delta\lambda_o$ of this wavelength centered about $\lambda_o$ will typically be of the order of about 1/10 to 1/30 of the center wavelength. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite sense.

For light having wavelengths around $\lambda_o$ but not at $\lambda_o$, the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean, or "disturbed," texture. If $\lambda_o$ is in the visible region of the spectrum, the liquid crystalline film appears to have the color corresponding to $\lambda_o$ and, if $\lambda_o$ is outside the visible spectral region, the film appears colorless for viewing at normal incidence.

Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having helical structure which is right-handed in sense will transmit RHCPL. This property of cholesteric liquid crystals has been referred to as "reflective circular dichroism."

Hereinafter, these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely, a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50 percent transmitting at $\lambda_o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2np$, it is substantially completely reflected and, after reflection, remains RHCPL. If the same light were to be directed on a mirror, the reflected light would by LHCPL. The present invention exploits these unique properties of optically negative liquid crystalline materials to provide a novel imaging system.

In operation, collimated monochromatic light is directed upon liquid crystal imaging member 10, preferably at normal incidence. By the term "monochromatic light" as it is used throughout the specification and in the claims is meant a relatively narrow wavelength band of up to about 100 angstroms and includes, but is not limited to, light of a single wavelength. As will become readily apparent from the detailed description of the invention, the quality of the imaging system is dependent to a large extent upon the width of the wavelength band of the incident monochromatic light. The incident light is selected to have wavelength(s) close to the center wavelength $\lambda_o$ of the wavelength reflection band of the liquid crystalline material which comprises film 18. The center wavelength $\lambda_i$ of the incident light is preferably separated from the center wavelength $\lambda_o$ of the wavelength band reflected by the liquid crystal film by approximately the half intensity bandwidth $\Delta\lambda_o$ of the reflection band. For example if the half intensity bandwidth is about 200 A then the center wavelength $\lambda_i$ of the incident light should be about 200 A away from $\lambda_o$. Hence, initially the incident light passes through the imaging member substantially unattenuated by film 18 and the reflected and/or transmitted light is not diffusely scattered by the film, that is, it can be viewed only at a small range of angles near the angle of incidence.

Subsequently, an electric field is established across the liquid crystal film 18 between the electrodes. The electric field is of a strength which is sufficient to effect a change in the pitch, and consequently, the location of the wavelength reflection band, of the liquid crystalline material. The wavelength reflection band of the liquid crystalline material is shifted to a location which coincides with the wavelength(s) of the incident light and which satisfies the conditions for diffuse scattering with the result that the liquid crystal film 18 diffusely scatters the incident light. Hence, it can be seen that a relatively small shift in the pitch of the liquid crystalline material causes the liquid crystal film 18 to be converted from a substantially non-scattering state to a diffusely scattering condition. The liquid crystalline material can be returned to its initial condition by removing the electric field. Alternatively the relaxation process may be enhanced in the case of dielectrically negative liquid crystalline materials by application of an A.C. electric field of the proper frequency. For a more detailed description of this technique see U.S. Pat. No. 3,680,950.

Figure 2:
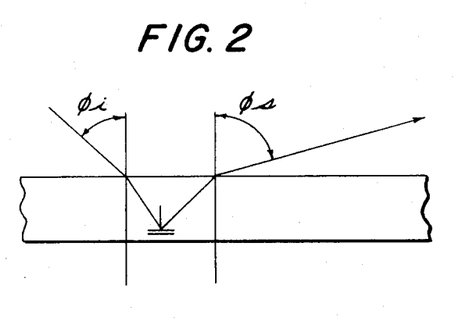
FIG. 2 illustrates the light scattering characteristics of a liquid crystal film having optically negative characteristics.

A more complete description of the invention involves a discussion of the characteristics of the Grandjean texture state of optically negative liquid crystalline materials. In addition to the property of reflective circular dichroism, optically negative liquid crystalline materials exhibit a property which has been referred to as dispersive reflection, that is, when white light is incident on a film of these materials, different colors are reflected at different angles. This property has been attributed to a distribution of Bragg-like scattering sites embedded in a medium of refractive index, $n$ (see J. Fergason, *Mol. Cryst.* 1, 293, 1966). The geometry for this condition is shown in FIG. 2 and the relationship among the angle of incidence, $\phi i$, angle of observation, $\phi s$, and pitch, $p$, is given by the expression $$\lambda = 2np \cos \tfrac{1}{2} \left\{ \sin^{-1}(\sin \phi i/n) + \sin^{-1}(\sin \phi s/n) \right\} \quad (1)$$

It has been shown in the art that the Grandjean texture is made up of regions of helical order, each of which comprises a scattering site. If the Grandjean texture were a perfect texture, i.e., if the scattering sites were parallel to each other, and if the pitch of each helical structure were exactly the same incident wavelengths of light at and near $\lambda_o$ would be reflected by any optically negative material with the angle of reflection being equal to the angle of incidence. For example, light striking the liquid crystal film at normal incidence would all be specularly reflected. However, in actual practice such is not the case. Inherently, in the Grandjean texture, the regions of helical order (on the order of microns in width) are only approximately parallel to each other and the pitch of an optically negative liquid crystal film is not uniform across the film but instead varies by a few percent. Thus, when an incident light beam has a bandwidth which is larger than these spatial irregularities in the liquid crystal film, the incident light is scattered, i.e., reflected or transmitted in more than one direction, over some small range of angles. In other words, the angle of reflection or transmission for some of the reflected or transmitted light would not equal the angle of incidence. The correlation between angle of incidence and angle of reflection for a given wavelength of light with respect to any particular optically negative liquid crystalline substance is given by formula (1).

Because of the spatial irregularities which exist in the optically negative liquid crystal film, collimated monochromatic incident light is reflected or transmitted with some spatial broadening, i.e., the reflected or transmitted light can be viewed at angles other than the angle of incidence. However, it should be noted that the viewing angle is relatively small. The effect of pitch distribution across the liquid crystal film is given by the expression $$\frac{\delta \phi s}{\delta p} = \frac{\lambda \cos \phi s}{np^2 \sqrt{n^2 - \sin^2 \phi s} \sin 1/2} \cdot \left\{ \sin^{-1}\left(\frac{\sin \phi i}{n}\right) + \sin^{-1}\left(\sin \frac{\phi s}{n}\right) \right\} \quad (2)$$

As aforesaid, the pitch of the optically negative liquid crystalline material within a film typically varies by a few percent, thus resulting in beam spread of a few degrees for the scattered light. However, for special cases where the conditions for diffuse scattering are satisfied, extreme spatial broadening of the scattered light is observed and the light scattered by any area of the liquid crystal film is observable from a wide range of angles. It can be seen from equation (2) that the conditions for obtaining diffuse scattering for incident light of a wavelength equal to $2np$ striking an optically negative film are present over a range of angles up to about 15° from normal incidence. Outside of this range the extent of spatial broadening begins to substantially deteriorate.

Optimum spatial broadening of the reflected or transmitted incident light is obtained when the light strikes the film at normal incidence. For normal incidence the effect of pitch distribution across the liquid crystal film is given by the expression $$\frac{\delta \phi s}{\delta p} = \frac{\lambda \sqrt{n^2 - \sin^2 \phi s}}{2np^2 \cos \phi s \sin 1/2 \left\{ \sin^{-1}\left(\frac{\sin \phi s}{n}\right) \right\}} \quad (3)$$

Thus it can be seen that where incident light striking an optically negative liquid crystal film is of a wavelength equal to $2np$ and $\phi s = o$, a change in pitch of about 3 percent results in a change in $\phi s$ of about 60° because of the singularity in equation (3).

Thus, it will be appreciated that any area of an optically negative liquid crystal film can be changed from a condition where it does not diffusely scatter incident collimated monochromatic light to a state where it diffusely scatters such light, or vice versa, by changing the pitch of the liquid crystal material locally by a few percent. It will therefore be apparent that the present imaging system involves intentionally causing an optically negative liquid crystal film, or a portion thereof, to assume a condition whereby it will diffusely scatter particular incident collimated monochromatic light. The advantageous imaging system accomplishes this result by effecting a pitch change of only a few percent whereas prior art imaging or display systems which involve a pitch change typically require relatively large changes. Thus, the driving conditions for carrying out the present imaging system are considerably relaxed in comparison to typical prior art systems.

In the liquid crystal imaging members described in FIG. 1, the substantially transparent substrate 12 and the substantially transparent conductive layer 14 of the blocking electrodes may be of any suitable materials. Typical suitable substrates include glass or plastic materials. Typical suitable transparent conductive layers include continuously conductive coatings of conductors, such as tin, indium oxide, aluminum, chromium, tin oxide or any other suitable conductors. These substantially transparent conductive coatings are typically evaporated onto the more insulating transparent substrate. NESA glass, a tin oxide coated glass manufactured by the Pittsburgh Plate Glass Company, is a commercially available example of a typical substantially transparent conductive layer coated over a transparent substrate.

The spacer 16 in FIG. 1, which separates the substantially transparent electrodes and contains the liquid crystalline film between the electrodes is typically chemically inert, transparent, not birefringent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof. The spacer, which approximately defines the thickness of the imaging film or layer is typically less than 250 microns thick and preferably has a thickness of from about 0.5 to about 50 microns.

Any suitable optically negative liquid crystalline material, mixtures thereof or compositions exhibiting optically negative characteristics may be used to provide liquid crystal film 18. Liquid crystal film 18 may be of any thickness and is preferably from about 0.5 to about 50 microns. For optimum results, the liquid crystal film will have a thickness of from about 0.5 to about 20 microns. It should be noted that the effects obtained in accordance with the present invention do not depend on film thickness except to the extent that the film thickness should preferably be greater than $\lambda_o$ in order to produce full intensity in the reflected light. When the film is relatively thin, i.e., when it has a thickness less than wavelength $\lambda_o$, it will typically not selectively reflect light at and around $\lambda_o$ as efficiently as has been previously described. When the film is of relatively great thickness, then the molecules will typically not align properly and the observed behavior will not be consistent with the optimum results attainable with the advantageous imaging system. For liquid crystal films having a $\lambda_o$ in the visible region, film thickness of from about 3 to about 10 microns will provide optimum results.

Cholesteric liquid crystal materials are suitable for use in liquid crystal film 18. Typical suitable cholesteric liquid crystalline materials include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl propionate; cholesteryl acetate; cholesteryl valerate; cholesteryl vaccenate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol, such as cholesteryl decyl ether; cholesteryl lauryl ether, cholesteryl oleyl ether; cholesteryl dodecyl ether; carbamates and carbonates of cholesterol, such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate, cholesteryl-p-nonylphenyl carbonate; cholesteryl-2-(2-ethoxyethoxy) ethyl carbonate; cholesteryl-2-(butoxyethoxy) ethyl carbonate; cholesteryl-1-2-(2-methoxyethoxy) ethyl carbonate; cholesteryl geranyl carbonate; cholesteryl heptyl carbamate; and alkyl amides and aliphatic secondary amines derived from 3 β-aminoΔ5-cholestene and mixtures thereof; peptides such as poly-δ-benzyl-l-glutamate; derivatives of beta sitosterol, such as sitosteryl chloride; and amyl ester of cyanobenzylideneaminocinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystal materials in the advantageous system of the present invention.

In addition to the above cholesteric liquid crystalline materials, the imaging layer may comprise mixtures of cholesteric and nematic liquid crystalline materials. For example, mixtures like cholesteryl chloride: cholesteryl nonanoate: p-azoxyanisole; or cholesteryl chloride: cholesteryl nonanoate: cholesteryl oleyl carbonate: p-azoxyanisole may be used.

Other nematic liquid crystalline materials suitable for use in imaging compositions used in the present imaging system include: p-azoxyanisole, p-azoxyphenetole, p-butoxybenzoic acid, p-methoxycinnamic acid, butyl-p-anisylidene-p'-aminocinnamate, anisylidene-p-aminophenylacetate, p-ethoxybenzylamino-α-methylcinnamic acid, 1,4-bis (p-ethoxybenzylidene) cyclohexanone, 4,4'-dihexyloxyazoxybenzene, 4,4'-diheptyloxyazoxybenzene, anisal-p-aminoazobenzene, anisaldazine, α-benzeneazo-(anisal naphthylamine), anisylidene-p-n-butylaniline, p-ethoxybenzylidene-p'-n-butylaniline and mixtures thereof. Members of the stilbene and tolane families of compounds are preferred nematic materials.

Compositions suitable for use in the inventive system may also comprise mixtures of cholesteric liquid crystals and suitable smectic liquid crystalline substances. Typical suitable smectic liquid crystal substance include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate and other open chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl4-carboxylic acids; ethyl-p-azoxycinnamate; ethyl-p-4-ethoxybenzylideneaminocinnamate; ethyl-p-azoxybenzoate; potassium oleate; ammonium oleate; p-n-octyloxybenzoic acid; the low temperature mesophase of 2-p-n-alkoxybenzylideneaminofluorenones with chain length of 7 or greater; the low temperature mesophase of p-(n-hepthyl) oxybenzoic acid; anhydrous sodium stearate; thallium (I) stearate; mixtures thereof and others.

Any suitable optically active, non-mesomorphic material may be used in the liquid crystalline imaging compositions employed in the present imaging system. These optically active, non-mesomorphic materials may be combined with cholesteric liquid crystalline materials or optically negative compositions including cholesteric liquid crystalline materials. Additionally, optically active, non-mesomorphic materials may be mixed with suitable nematic liquid crystalline materials to form compositions which exhibit optically negative properties. These non-mesomorphic materials should be compatible with the liquid crystalline materials with which they are combined. When mixed with liquid crystalline materials, the non-mesomorphic material typically comprises from about 2 percent to about 60 percent by weight of the composition; broadly, however, it should be noted that the amounts of the respective components present in any imaging composition suitable for use in the present imaging system are controlled only by the requirement that the imaging composition should exhibit optically negative properties. Typical suitable optically active, non-mesomorphic materials include: derivatives of alcohols such as *l*-menthol, *l*-linanool, d-mannitol, d-borneol and d-guercitol; derivatives of ketones such as d-camphor, d-3-methylcyclohexanone, *l*-menthone and *l*-6-isoptopyl-3-cyclohexanone; derivates of carboxylic acids such as d-citronellic acid, *l*-citronellic acid, d-chaulmoogric acid, *l*-campholic acid, *l*-arabonic acid, d-tartaric acid and *l*-ascorbic acid; derivatives of aldehydes such as d-citronellal; derivatives of alkenes such as *l* - $\beta$ -pinene, d-silvesterene, and d-limonene; derivatives of amines such as *l*-2-methylpiperidine; derivatives of nitriles such as d-mandelonitrile; cholesterol and derivatives thereof; and mixtures thereof.

The above lists of materials are not intended to be exhaustive or limiting. The lists disclose a variety of representative materials suitable for use in the imaging compositions which comprise the active element in the present invention. It should be noted, of course, that the imaging compositions which are suitable for use according to the present invention exhibit the requisite properties which make them suitable for use at some specific temperature range which may be at or near room temperature or substantially above or below room temperature. Typically, the imaging method will be carried out at or near room temperature and it is, therefore, preferred to employ imaging compositions which exhibit a liquid crystal state at or near room temperature. Generally, the imaging composition will exhibit the liquid crystalline state at the desired operational temperature. Again, it is noted that the liquid crystal imaging layers or films suitable for use in the invention are preferably of a thickness in the range of about 50 microns or less, although thicker films will perform satisfactorily in some embodiments of the invention. Optimum results are typically achieved using layers in the thickness range of from about 0.5 microns to about 20 microns.

Mixtures of the liquid crystalline materials and mixtures including the optically active, non-mesomorphic material may be prepared in organic solvents such as chloroform, petroleum ether, methyl ethyl ketone and the like, which are typically subsequently evaporated from the mixture thereby leaving the imaging composition. Alternatively, the individual components of the imaging compositions can be combined directly by heating the mixed components to a temperature which is above the isotropic transition temperature of the liquid crystalline components and the melting point of any non-mesomorphic material.

As noted previously, the incident light used in the inventive imaging system is collimated (approximately parallel) monochromatic light and may be of any type including, for example, plane polarized, substantially completely linearly polarized or substantially completely circularly polarized light. The incident light may be provided by any source which inherently emits light possessing the required characteristics or which does so in conjunction with other elements. Collimated light is inherently emitted by some light sources such as lasers; alternatively, it may be provided through the use of a light collimating system in conjunction with any light source. Substantially, completely linearly polarized light is intrinsically emitted by various lasers or it may be obtained from light sources which provide it in conjunction with other elements as, for example: sources which emit essentially linearly polarized light combined with some randomly polarized (or unpolarized) light, such as light emitting diodes which should be used in combination with some means for removing all but linearly polarized light with a preferred direction, such as a linear polarizer; and broad band sources such as incandescent light sources which are employed with band pass filters such as, for example, those described in Adams et al. U.S. Pat. No. 3,669,525. Lasers typicallly emit collimated monochromatic substantially completely linearly polarized light and, consequently, it is preferred to use lasers as the light source because of the simplicity of the element.

Plane polarized light contains equal amounts of RHCPL and LHCPL and, as previously noted, linearly polarized light is made up of approximately 50% RHCPL and 50% LHCPL. Thus, since any optionally negative liquid crystal film, in the vicinity of its light reflection band, will only reflect light which is circularly polarized in one direction and transmit only light which is circularly polarized in the opposite direction it will be appreciated that when plane polarized or substantially completely linearly polarized light is incident upon the imaging member a substantial portion of the light is not utilized. Whether the imaging member is viewed in reflection or in transmission effectively only up to about 50% of the light is used. To provide a more efficient imaging system, it is preferred to use light which is substantially completely circularly polarized in a direction which is reflected (for reflection viewing) or transmitted (for transmissive viewing) by the liquid crystal film. This may be conveniently accomplished by inserting optional circular polarizer means 26 in the path of the incident light. Circular polarizer means 26 may comprise any material which is capable of substantially completely circularly polarizing the incident light. Typical suitable materials include commercial anti-reflection sheets which essentially are made up of a polarizer and a retarder such as, for example, H Neutral CP 37 Polaroid Sheet (available from Polaroid Corp.). Generally, any material which exhibits circular dichroism can be used for this purpose. When viewed in the reflection mode, the reflected light passes back through the circular polarizer means 26 unaffected since the sense of polarization of the light is not changed due to the anomalous reflection properties of optically negative liquid crystalline materials. Although circular polarizer means 26 is shown spaced apart from imaging member 10, it should be noted that it could be in contact with the imaging member or be an integral part of the imaging member. Contrast enhancement means may be used to cut down front surface reflections when the imaging member is viewed in reflection.

Figure 3:
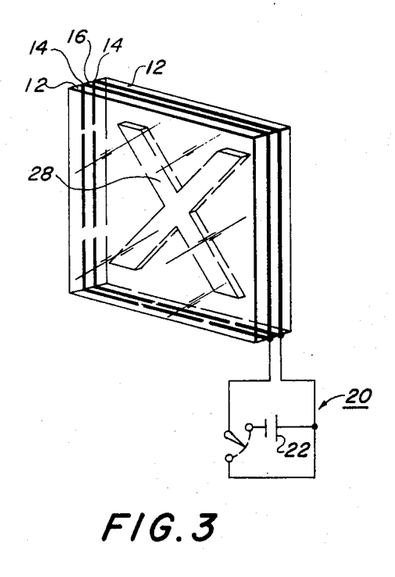
FIG. 3 is a partially schematic isometric view of a liquid crystalline imaging member wherein the desired image is defined by the shape of the liquid crystalline material.

In FIG. 3 another preferred embodiment of a liquid crystal imaging member is shown with the desired image defined by the shape of the void areas in spacer gasket 16. As shown in FIG. 1, transparent electrodes are separated by spacer 16 but the entire desired image area 28 comprises the liquid crystal film or layer. In this embodiment, the entire inner faces of the transparent electrodes comprise substantially transparent conductive coating 14 and the conductive coatings are electrically connected to external circuit 20. In operation there is an electrical field across the entire area of the spacer 16; however, the incident light is reflected only in the area 28 where the liquid crystal film is present. Again here, depending on whether the desired image is to be viewed by transmitted or reflected light, both or only one of the electrodes, respectively, may be transparent.

Figure 4:
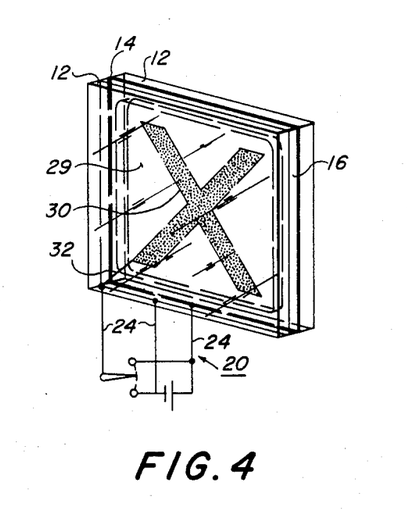
FIG. 4 is a partially schematic isometric view of a liquid crystalline imaging member wherein the desired image is defined by the shape of at least one of the electrodes.

FIG. 4 illustrates another preferred embodiment of a liquid crystal imaging member. In FIG. 4 the desired image is defined by the shape of an electrode and therefore by the shape of the corresponding electrical field. The imaging member here comprises transparent plates 12 separated by spacer gasket 16 having a void area 29 filled with a liquid crystal film and comprising substantially the entire area of spacer member 16. The desired image is defined by the shape of the substantially transparent conductive coating 30 which is affixed to the inner surface of one or both of the transparent support plates 12 and affixed only in the desired image configuration. The embodiment illustrated in FIG. 4 shows only one of the two electrodes in image configuration; however, it will be understood by those skilled in the art that both electrodes could easily be made in a matched pair to define the same desired image. When the single image electrode configuration is used, the second electrode will comprise transparent plate 12 with substantially transparent conductive coating 14 upon the entire area of the inner surface of the transparent electrode. It is noted that a very thin or substantially invisible conductor 32 is necessary in this embodiment to electrically connect the electrode in the desired image configuration to external circuit 20 which is similarly connected to the conductive coating of the opposite electrode. In operation this embodiment will produce an electric field only in areas where there are parallel electrodes, i.e., between the electrode in the desired image configuration and the opposite electrode, whether or not the second electrode is also in the desired image configuration Again here, one of the electrodes may be opaque if it is desired to observe the imaged member by reflected light rather than transmitted light.

Figure 5:
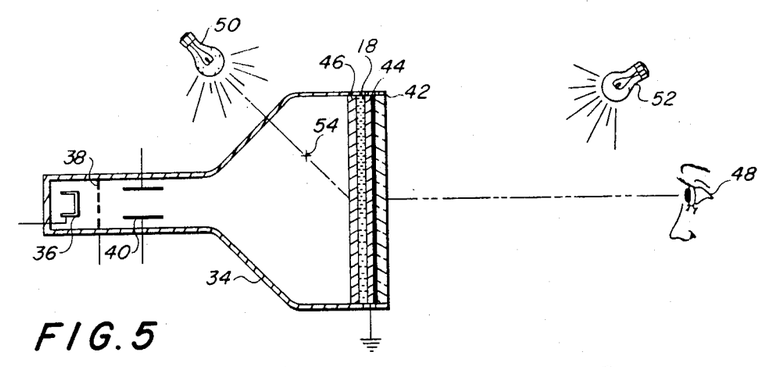
FIG. 5 is a partially schematic, cross-sectional view of an imaging system wherein a liquid crystalline imaging member is imaged by an electron beam address system.

In FIG. 5 another preferred embodiment of the advantageous imaging system is illustrated wherein an electron beam address system is provided for the generation of an imagewise field across an optically negative liquid crystal film. In FIG. 5, the electron beam address system is within vacuum tube 34 and the address system itself comprises electron gun 36, accelerator 38 and deflector 40 which are provided with electrical leads through vacuum tube 34 so that suitable electrical circuitry may be connected therewith to operate the electron beam imaging system.

The liquid crystalline imaging member in conjunction with the electron beam address system comprises substantially transparent substrate 42 upon which substantially transparent conductive coating 44 is affixed. The liquid crystal imaging film 18 may be coated directly onto substantially transparent conductive coating 44 (which is grounded), provided the liquid crystalline material has a sufficiently high viscosity to support itself on a surface even when the surface is oriented vertically or horizontally with the liquid crystalline imaging layer on the lower surface of such horizontal imaging member. Alternatively, transparent insulating layer 46 may be placed over liquid crystal imaging film 18 to protect and support the liquid crystal material. The impingement of electrons from electron gun 36 upon layer 46 or liquid crystalline imaging film 18 creates a momentary field when taken in conjunction with grounded transparent conductive layer 44. This momentary field across liquid crystal film 18 causes the pitch of the liquid crystal material to be selectively shifted by a few percent thereby creating an image visible to an observer 48.

Another embodiment of the electron beam address system is a configuration wherein the electric field created by the electron beam is transmitted through a thin layer which is substantially insulating in the lateral directions parallel with the plane of the layer but is substantially conductive in the direction perpendicular to the plane of the layer (i.e., a pin tube). This embodiment permits the liquid crystal layer to be outside the vacuum system. For transient displays using this embodiment of the electron beam address system, the face plate is substantially insulating in all directions.

It will also be appreciated that the electron beam address system may be used in conjunction with an electroded liquid crystalline imaging member wherein the sum of the fields created by the electrode system and the electron beam address system is sufficient to create a total field of strength sufficient to shift the pitch of the liquid crystalline material the necessary amount. Similarly, any suitable combination of address systems including any of the other systems disclosed herein and others may be combined in the same manner to produce the desired result.

The incident collimated monochromatic light is provided by source 50 or source 52 both illustrated herein to show that the liquid crystalline imaging member comprising the face of vacuum tube 34 may be observed by light transmitted, as from light source 50, or reflected, as from light source 52. Alternatively, transmitted light may originate from a source placed inside vacuum tube 34 at a location indicated, for example, at point 54. However, the in-tube source of illumination should be so placed so as to not interfere with the electron beam which creates the image on the face of the tube.

Again, here it is noted that the light source may be any which inherently, or in combination with other elements, provides collimated monochromatic light. Of course, circular polarizer means may be used where substantially completely circularly polarized light is desired.

Figures 6, 7:
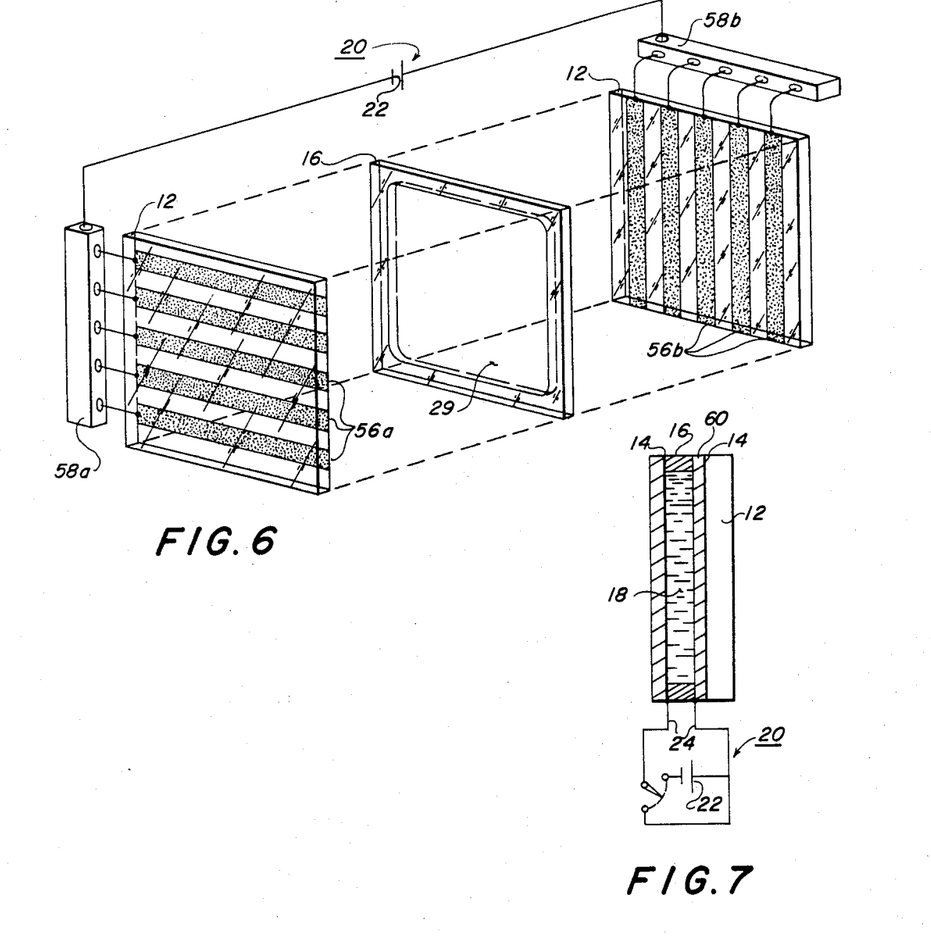
FIG. 6 is an exploded isometric view of an imaging system wherein a liquid crystalline imaging member is imaged by an X-Y address system.
FIG. 7 is a partially schematic, cross-sectional view of an imaging system wherein a liquid crystalline imaging member includes a photoconductive insulating layer.

In FIG. 6 an X-Y address system suitable for imaging an optically negative liquid crystalline imaging member is illustrated in exploded isometric view. The liquid crystalline imaging film is placed in void area 29 within the transparent and substantially insulating spacer gasket 16. The liquid crystalline film and the spacer are sandwiched between a pair of substantially transparent support plates 12 upon which strips of substantially transparent conductive material 56 are coated. The substantially transparent electrodes are oriented so that conductive strips 56b and conductive strips 56a on the respective electrodes cross each other in an X-Y matrix or grid. Each conductive strip in each set of parallel strips 56a and 56b is electrically connected to a circuit system 58 which is suitable for selective or sequential operation. Through selection systems 58 and external circuit 20 including a source of potential 22, an electrical field suitable for shifting the pitch of the optically negative liquid crystalline material can be created across selected points or a selected sequence of points. It will be understood that substantially transparent conductive strips 56 may vary in width from a very fine, wire-like structure to any desired strip width. In addition, one support plate 12 may be opaque where the imaging system is to be observed in reflected light.

FIG. 7 describes another preferred embodiment of a liquid crystalline imaging member wherein one of the electrodes has adjacent thereto a photoconductive insulating layer and imaging is effected by applying a uniform potential across the entire area of the electrodes and exposing the photoconductive insulating layer 60 to an imagewise pattern of activating electromagnetic radiation corresponding to a desired image configuration. In operation of the device, an imagewise pattern of activating radiation is directed upon the imaging member from the right side while an electric field is established between the electrodes by means of external circuit 20 to opposite sides of which are connected conductive layers 14 of the respective electrodes. Accordingly, an imagewise electric field is established across the liquid crystalline film 18 and causes the desired pitch change. Of course, photoconductive layer 60 may comprise any suitable photoconductive insulating material such as selenium or any of the many materials which are known for use in the xerographic reproduction process. A light source for providing the incident collimated monochromatic light may be arranged on either side of the imaging member.

When it is desired to view the imaging member using transmitted light, it is required that both electrodes be substantially transparent. Of course, in this instance, there is required a photoconductive insulating layer which is substantially transparent to the viewing radiation. Typical suitable substantially transparent photoconductive materials include, for example, relatively thin (about 5 microns) layers of selenium. The imaging member may also be viewed using reflected light in which case only a single transparent electrode is required while the other may be opaque. Again, it is noted that the sources of potential used in the circuits which produce the electric fields in the various address systems suitable for use in the advantageous imaging system of the present invention may be either A.C., D.C., or combinations thereof.

Although the invention has been illustrated with respect to effecting a pitch change in an optically negative liquid crystal material by means of an applied electric field, it should be recognized that other techniques for changing the pitch may also be used. The pitch of optically negative liquid crystalline materials is known to be effected by various stimuli such as for pressure, temperature, magnetic fields, foreign chemical vapors, etc. Hence, the relatively small pitch change of the present advantageous imaging system may be effected by applying to the liquid crystal film any stimulus to which the pitch of the liquid crystalline material is sensitive. For example, a stylus may be used to "write" on the imaging member; or energy which provides a thermal effect in the liquid crystalline material may be directed upon the liquid crystal film to heat the material and thereby bring about the desired pitch shift. Various other techniques for applying an electric field across the imaging film can also be used, such as, for example, an electrical stylus and uni-planar, multiple cell liquid crystalline imaging members such as are described in U.S. Pat. No. 3,652,148. According to another technique a cathode ray tube may be used to effect the pitch change in the liquid crystalline material. In this embodiment the pitch change would be caused by the pressure effect of ions impinging upon the liquid crystalline film. A film of a dielectric material such as Tedlar would preferably be arranged adjacent the liquid crystal film in this instance.

The following example further specifically defines the present imaging system. It should be understood that the example is intended to be illustrative only and the invention is not limited to the materials, conditions, procedures, etc. recited therein. All parts and percentages are by weight unless otherwise specified.

A thin film of a 35:65 mixture of cholesteryl chloride and cholesteryl nonanoate is formed on a glass slide and another glass slide is placed over the free surface of the liquid crystal film. The liquid crystalline material has a $\lambda_o$ of about 6100 A. Collimated linearly polarized light having a wavelength of 6328 A provided by a Model 130D helium-neon gas laser (Spectraphysics Corp., Mountain View, California) is directed upon the liquid crystal film at normal incidence and at room temperature. An observer viewing the film in transmission and looking from the side of the film initially does not see anything.

The liquid crystal film is then heated locally with a heat gun at gentle heat for about two seconds. As the conditions for diffuse scattering are met in the heated areas of the liquid crystalline film, the observer is able to see the light transmitted by the heated areas of the film since it is now transmitted with extreme spatial broadening.

It will be understood that various other changes in the details, materials, steps and arrangements of elements which have been described herein and illustrated in order to explain the invention will occur to and may be made by those skilled in the art upon a reading of the present disclosure and such modifications are intended to be included within the principle of the invention and the scope of the claims.

What is claimed is:

1. A method for placing a layer of an optically negative liquid crystal material in a diffusely light scattering condition comprising
    a. providing a layer of an optically negative liquid crystalline material in its Grandjean texture state, said optically negative material having a light reflection band with center wavelength $\lambda_o$.
    b. directing incident collimated monochromatic light upon said liquid crystal layer at an angle of incidence from 0° to about 15°, wherein said incident light is not diffusely scattered by said liquid crystal layer; and
    c. applying to said liquid crystal film some external stimulus which is capable of changing the location of the light reflection band and applying said stimulus until the incident light is diffusely scattered by said liquid crystal layer
    whereby the diffusely scattered light is observable from a wide range of angles.

2. The method as defined in claim 1 wherein said liquid crystalline layer is arranged between a pair of electrodes at least one of which is substantially transparent and said external stimulus comprises an electric field.

3. The method as defined in claim 2 wherein said liquid crystal layer is shaped in a desired image configuration.

4. The method as defined in claim 2 wherein said electric field is applied to said liquid crystal layer in imagewise configuration.

5. The method as defined in claim 4 wherein said electrodes comprise an X-Y address system.

6. The method as defined in claim 4 wherein at least one of said electrodes is shaped in a desired image configuration.

7. The method as defined in claim 4 wherein one of said electrodes includes a photoconductive insulating surface and imagewise activating electromagnetic radiation is directed upon said photoconductive insulating surface.

8. The method as defined in claim 2 wherein the liquid crystal layer has a thickness of from about 0.5 to about 50 microns.

9. The method as defined in claim 2 wherein said incident light is substantially completely circularly polarized.

10. The method as defined in claim 2 wherein said incident light is provided by a laser.

11. The method as defined in claim 2 and further including the step of removing said electric field.

12. The method as defined in claim 2 wherein said optically negative liquid crystal film has a $\lambda_o$ in the visible region of the electromagnetic spectrum.

13. The method as defined in claim 2 wherein said optically negative liquid crystalline material comprises a cholesteric liquid crystalline material.

14. The method as defined in claim 2 wherein said optically negative liquid crystalline material comprises a mixture of cholesteric and nematic liquid crystalline materials.

15. The method as defined in claim 2 wherein said optically negative liquid crystalline material comprises a mixture of nematic liquid crystalline material and optically active non-mesomorphic material.

16. The method as defined in claim 2 wherein the liquid crystal layer has a thickness of from about 0.5 microns to about 20 microns.

17. The method as defined in claim 12 wherein the liquid crystal layer has a thickness of from about 3 microns to about 10 microns.

* * * * *